(12) United States Patent
Ishikawa (10) Patent No.: US 8,157,309 B2
(45) Date of Patent: Apr. 17, 2012

(54) SUPPORT STRUCTURE

(75) Inventor: Shinya Ishikawa, Isehara (JP)

(73) Assignee: Nissan Motor Co., Ltd., Kanagawa (JP)

( * ) Notice: Subject to any disclaimer, the term of this patent is extended or adjusted under 35 U.S.C. 154(b) by 155 days.

(21) Appl. No.: 12/762,153

(22) Filed: Apr. 16, 2010

(65) Prior Publication Data

US 2010/0264680 A1  Oct. 21, 2010

(30) Foreign Application Priority Data

Apr. 21, 2009  (JP) ................. 2009-102662

(51) Int. Cl.
*B60N 2/46* (2006.01)
(52) U.S. Cl. ....... 296/1.08; 296/1.09; 280/751; 188/377
(58) Field of Classification Search ............. 188/371, 188/377; 280/751, 752; 296/1.08, 1.09, 296/153, 187.05
See application file for complete search history.

(56) References Cited

U.S. PATENT DOCUMENTS

| 7,775,584 B2* | 8/2010 | Hughes et al. ............ 296/187.05 |
| 7,922,227 B2* | 4/2011 | Beau ............................ 296/1.08 |
| 2005/0116456 A1* | 6/2005 | Tajima et al. ................. 280/751 |

FOREIGN PATENT DOCUMENTS

| CH | 689 638 A5 | 7/1999 |
| JP | 2000-085434 A | 3/2000 |
| JP | 2004360790 A | 12/2004 |
| WO | 0158302 A1 | 8/2001 |

OTHER PUBLICATIONS

European Search Report in EP Application No. 10157389.7-2424 dated Aug. 4, 2010 (7 pages).
Patent Abstract of Japan, Publication No. 2004360790, Publication Date Dec. 24, 2004 (1 page).
English Patent Abstract of CH689638 from esp@cenet, Publication Date Jul. 30, 1999 (1 page).
English Patent Abstract of JP2000085434 from esp@cenet, published Mar. 28, 2000 (1 page).

* cited by examiner

*Primary Examiner* — Dennis Pedder
*Assistant Examiner* — Jason S Daniels
(74) *Attorney, Agent, or Firm* — Osha • Liang LLP

(57) ABSTRACT

In one or more embodiments of the present disclosure a support structure includes a contact surface configured to deform, a base section configured to receive the contact surface, a first set of ribs extending from the contact surface toward the base section and inclined in a first direction, and a second set of ribs extending from the contact surface toward the base section and inclined in a second direction, in which the first set of ribs and the second set of ribs are disposed such that there is no contact with each other in a relaxed position, and in which the first set of ribs and the second set of ribs are configured to deform and contact each other upon application of a force to the contact surface.

22 Claims, 9 Drawing Sheets

SUPPORT STRUCTURE

CROSS-REFERENCE TO RELATED APPLICATIONS

The present application claims priority from Japanese Patent Application No. 2009-102662, filed Apr. 21, 2009. The contents of the priority application are hereby incorporated by reference in their entirety.

BACKGROUND OF INVENTION

1. Field of the Disclosure

This invention relates to a surface structure of an article for providing a low impact or softness feeling to the article.

2. Description of the Related Art

A Japanese patent provisional publication No. 2000-85434 discloses, as a surface structure of an article for providing a softness to the article, a surface in which a rib is formed on the backside of the surface while a projection is formed at a core section for receiving the skin. The rib is formed to be contactable with the projection. When the surface is depressed or pressed upon, the rib of the backside of the surface is brought into contact with the projection so that the rib is elastically deformed, thereby softening the impact felt during a depression of the surface.

SUMMARY OF INVENTION

In a conventional surface structure, a rib may be formed on the backside of a contact surface while a projection may be formed on a core section which is designed to receive the contact surface when the contact surface is depressed. To achieve this a precise locational relationship is required for assembling the tip position of the rib and the projection so that a desired soft feeling may be obtained, which may be difficult to achieve with a high precision.

A contact surface (such as a surface structure or skin) of an article, according to one or more embodiments of the present disclosure, may include a first projection section inclined in a first direction and may be located separate from a second projection section inclined in a second direction. The two projection sections may be inclined so that a direction of inclination of the two projections intersects. Upon the contact surface being pressed, the respective projection sections deform (or collapse) to approach each other and may come into contact with each other, thereby restricting complete collapse of the projections, and thereby maintaining a soft feeling and decreasing an impact force.

According to one or more embodiments of the present disclosure, the first projection section and the second projection section may deform and may come into contact with each other so as to restrict complete collapse of the projections, thereby providing a softness feeling. As a result, the softness feeling may be stably obtained regardless of assembly accuracy among parts. Accordingly, no rib-projection combination and/or alignment, requiring precise installation, may be required.

In one aspect, one or more embodiments of the present disclosure relate to a support structure including a contact surface configured to deform, a base section configured to receive the contact surface, a first set of ribs extending from the contact surface toward the base section and inclined in a first direction, and a second set of ribs extending from the contact surface toward the base section and inclined in a second direction, in which the first set of ribs and the second set of ribs are disposed such that there is no contact with each other in a relaxed position, and in which the first set of ribs and the second set of ribs are configured to deform and contact each other upon application of a force to the contact surface.

In another aspect, one or more embodiments of the present disclosure relate to a support structure including a contact surface configured to deform, a base section configured to receive the contact surface, a first means for softening a deformation of the contact surface disposed on the contact surface, and a second means for softening a deformation of the contact surface disposed on the contract surface, in which the first and second means for softening are disposed such that the first means and second means for softening have no contact in a relaxed position, and in which the first and second means for softening contact upon deformation of the contact surface.

In another aspect, one or more embodiments of the present disclosure relates to a method to make a support structure including disposing a first set of ribs on a contact surface in a first direction, and disposing a second set of ribs on the contact surface in a second direction, in which the first set of ribs and the second set of ribs are not in contact in a relaxed position, and in which the first set of ribs and the second set of ribs are in contact in a deformed position.

DETAILED DESCRIPTION

Hereinafter, a first embodiment of the present disclosure will be discussed with reference to the drawings.

A configuration of a support structure 100 in the first embodiment will be discussed.

Figure 1:
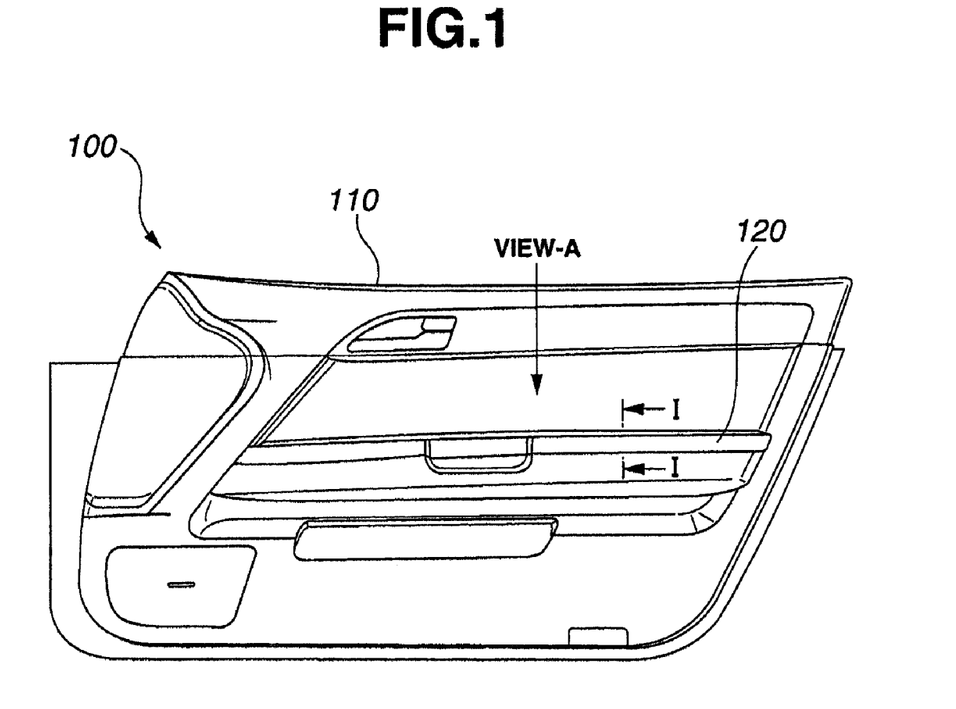
FIG. 1 is a side view of a vehicle in accordance with embodiments of the present disclosure, showing an interior part for a vehicle.
Figure 2:
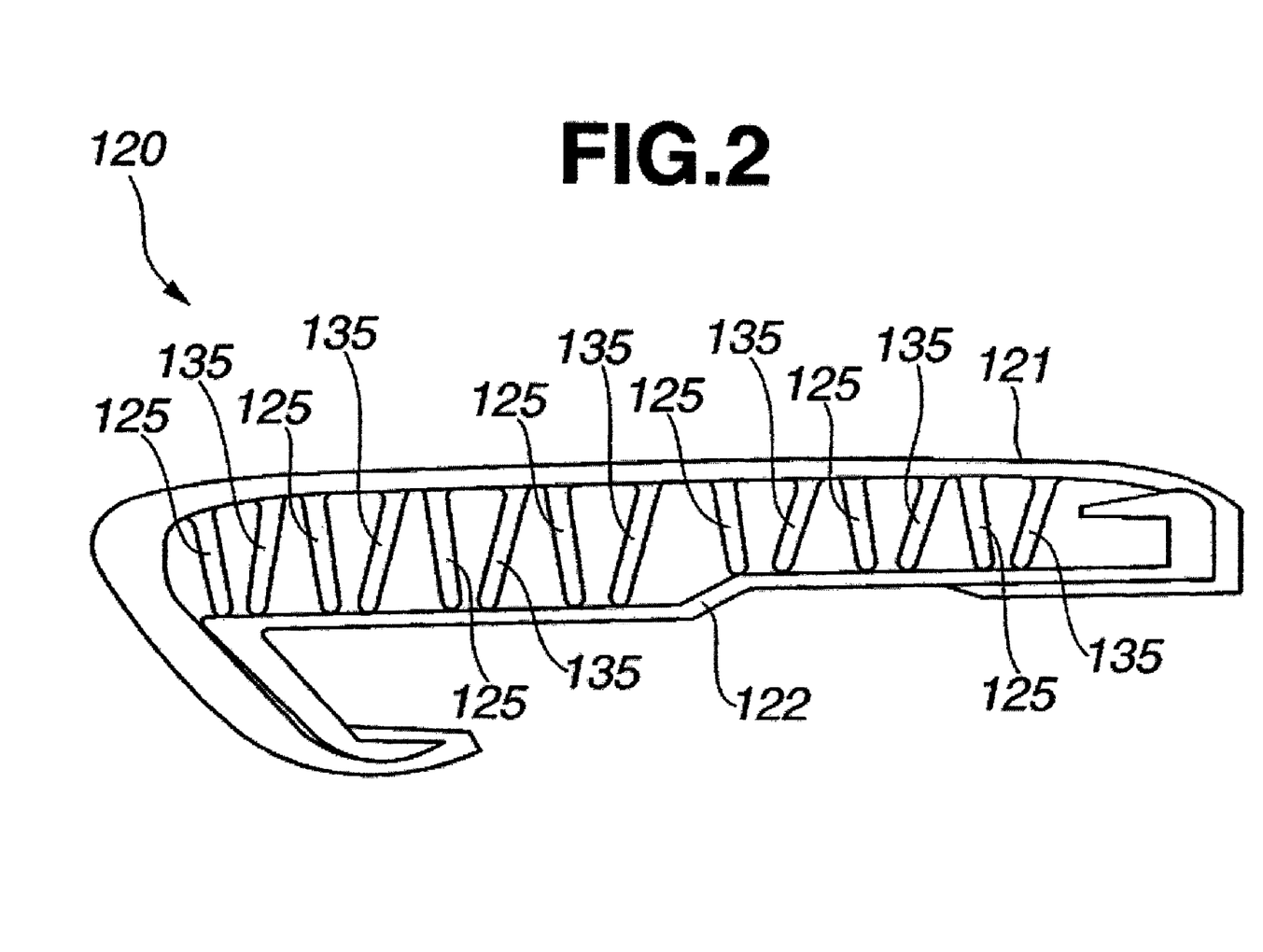
FIG. 2 is a sectional view taken along the line I-I of FIG. 1.

A support structure 100 in a first embodiment may include a contact surface 120, and a set of ribs 125 serving as first projection sections and a set of ribs 135 serving as second projection sections, which may be disposed on a backside (or underside) of contact surface 120, as shown in FIGS. 1 and 2.

Figure 3:
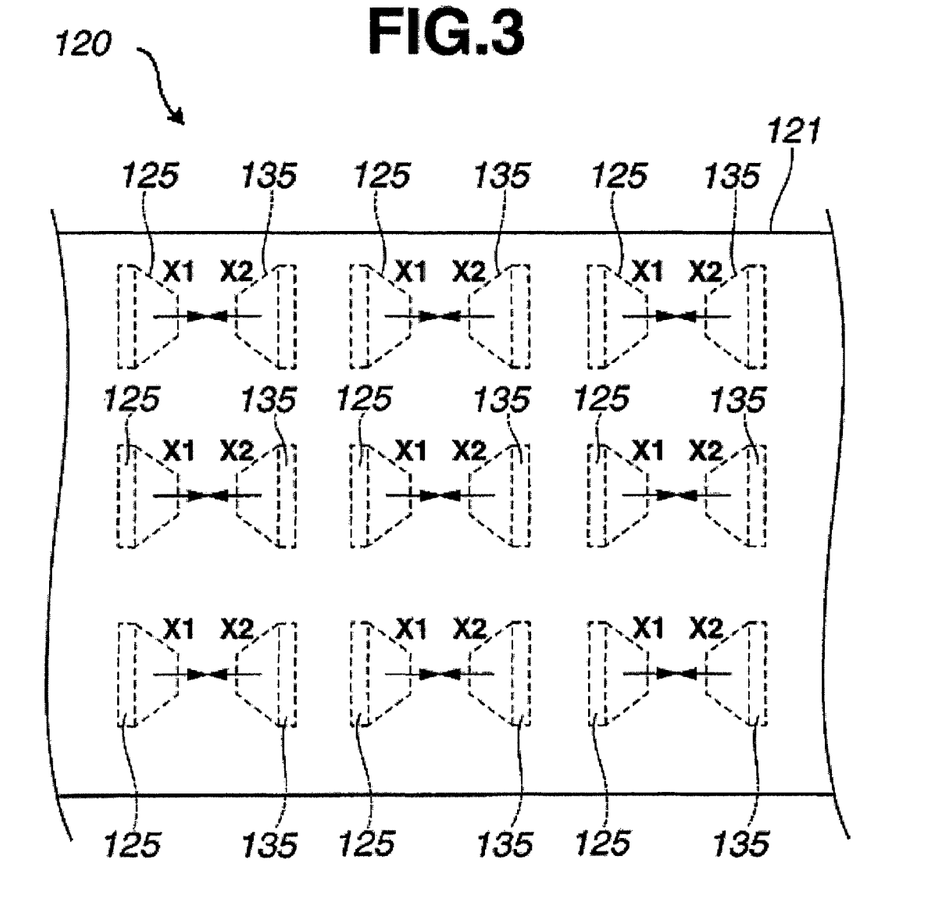
FIG. 3 is a top plan view of the vehicle, in the first embodiment, as viewed from VIEW-A of FIG. 1.

Referring to FIGS. 1-3, contact surface 120 may be fixed to a door trim 110 and may be assembled to a door panel (not shown) as a single body with door trim 110. Contact surface 120 may include a skin section 121 (which may be a surface of contact) and a base section 122. Ribs 125 and ribs 135 may be formed as projections extending from the backside surface of skin section 121 toward base section 122 and may be located between skin section 121 and base section 122. Ribs 125 and 135 may be regularly located and/or spaced adjacent to and separate from each other in such a manner so as not to contact with each other when in a relaxed position (non-compressed and/or non-collapsed position).

FIG. 2 shows a cross-sectional view along I-I of FIG. 1. In FIG. 2, ribs 125 and 135 are shown in the relaxed position, in which there is no contact between the ribs 125 and 135. FIG. 3 shows a top-view from View-A of FIG. 1. Again, ribs 125 and 135 are shown in the relaxed position, in which no contact is made between ribs 125 and 135. Further, arrows notated at X1 and X2 show the direction in which ribs 125 and 135, respectively, may collapse or deform when a load may be applied to skin section 121 of contact surface 120.

Figure 4:
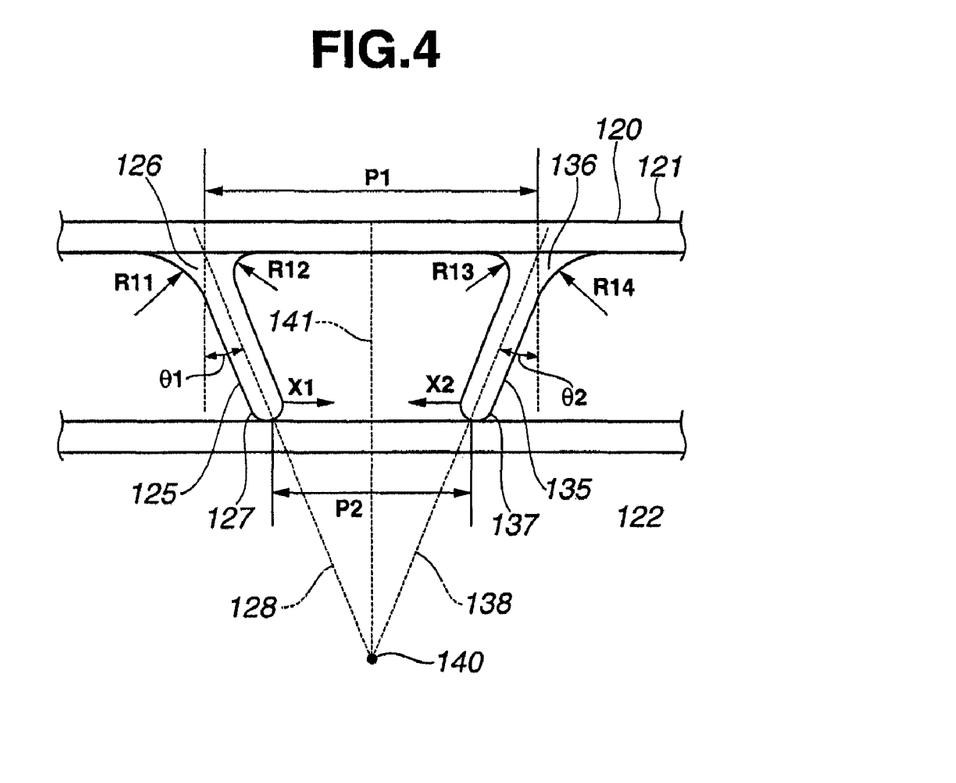
FIG. 4 is an enlarged view showing a first skin rib and a second skin rib in the first embodiment.

Now referring to FIG. 4, rib 125 may be inclined from a rib base section 126 toward a rib tip end 127. Rib tip end 127 may be in contact with base section 122. The inclination direction of rib 125 may be such that rib 125 may have an inclination angle θ1 relative to a vertical direction (shown as dashed line 141 of FIG. 4). First inclination angle θ1 may be set at such an angle that rib 125 may be released from a forming mold without being damaged after skin section 121 may be formed. According to one or more embodiments of the present disclosure, inclination angle θ1 may be between 15 degrees and 30 degrees. However, inclination angle θ1 is not limited to this particular range and may be suitably set, taking account of performances and characteristics of forming molds and materials.

Additionally, R (radius-based) shapes may be formed at the surface of each rib base section 126 and may be located between the rib base section 126 and skin section 121. The R shape on the opposite side (outside) to the side of a collapse direction X1 of each rib 125 is represented as R11 while the R shape on the side (inside) of collapse direction X1 of each rib 125 is represented as R12. R shape R11 may be formed larger than R shape R12, and an outside of rib base section 126 may be formed thicker than an inside of the same, as shown in FIG. 4. Accordingly, when a load may be applied to skin section 121, rib 125 may be guided to begin to deform and collapse toward rib 135. Rib tip end 127 may be shaped round and formed semicircular, so that rib 125 may be in slidable contact with and move on base section 122. Further, rib 125 may take the shape of a flat plate and may be tapered in width from skin rib base section 126 toward rib tip end 127. As a result, the initiation of the collapse of skin rib 125 may be softened thereby making it possible to obtain a softness feeling.

Skin rib 135 may be inclined from rib base section 136 toward rib tip end 137, as shown in FIG. 4. Rib tip end 137 may be in contact with base section 122. The inclination direction of rib 135 may be such that rib 135 may have an inclination angle θ2 relative to a vertical direction (shown as dashed vertical line 141) so that the rib 135 may be opposite to rib 125. In other words, a direction of inclination 138 of rib 136 and a direction of inclination 128 of rib 125 may intersect each other at an approximately intermediate position between rib 125 and rib 135 (intersection point 140), as shown in FIG. 4. Inclination angle θ2 may be set at such an angle that rib 135 may be released from a forming mold without being damaged after skin section 121 may be formed. According to one or more embodiments of the present disclosure, inclination angle θ2 may be between 15 degrees and 30 degrees. However, inclination angle θ2 is not limited to this particular range and may be suitably set, taking account of performances and characteristics of forming molds and materials.

Additionally, R (radius-based) shapes may be formed at the surface of rib base section 136 and may be located between rib base section 136 and skin section 121. The R shape on the opposite side (outside) to the side of a collapse direction X2 of rib 135 is represented as R14 while the R shape on the side (inside) of collapse direction X2 of rib 135 is represented as R13. R shape R14 may be formed larger than R shape R13. Accordingly, when a load may be applied to skin section 121, rib 135 may be guided to deform in a direction toward rib 125. Rib tip end 137 may be shaped round and formed semicircular, so that rib 135 may be in slidable contact with and move on base section 122. Further, rib 135 may take the shape of a flat plate and may be tapered from rib base section 136 toward rib tip end 137. As a result, the initiation of the collapse of rib 135 may be smooth thereby making it possible to obtain a softness feeling.

According to one or more embodiments of the present disclosure, a direction in which rib 125 deforms while collapsing (or deforming) may be a collapse direction X1, i.e., a direction toward an imaginary line 141 which extends from an intersection point 140 at which a direction of inclination 128 and a direction of inclination 138 intersect and may be perpendicular to skin section 121, as shown in FIG. 4. A collapse direction X2 in which rib 135 may collapse may be a direction toward imaginary line 141 and may be a direction opposite of collapse direction X1. Rib 125 and rib 135 may be formed of plastic such as TPO, PVC, TPU and/or the like, or any other suitable material known in the art which may allow for plastic deformation or collapse.

Additionally, a pitch P1 may be a distance between rib base section 126 and rib base section 136, whereas a pitch P2 may be a distance between rib tip end 127 and rib tip end 137. As shown in FIG. 4, pitch P1 may be set larger (or wider) than pitch P2. A ratio P2/P1 may be set between 0.35 and 0.7, however, those skilled in the art will appreciate that other ratios may be used without deviating from the scope of the present disclosure. With a set ratio P2/P1 configured, rib tip end 127 and rib tip end 137 may bend without a buckling feeling and/or a bottom-reaching feeling. Accordingly, it may be possible to obtain a stable softness feeling.

As applied to an arm rest of a vehicle, a contact surface in accordance with one or more embodiments of the present disclosure may provide a softness feeling to the arm of an occupant. Particularly, when an arm of an occupant may be rested upon the contact surface, the contact surface may depress and/or deform. Ribs in accordance with one or more embodiments of the present disclosure may allow for a reduced impact to the arm of an occupant as applied from the contact surface into the arm of the occupant.

Figure 5:
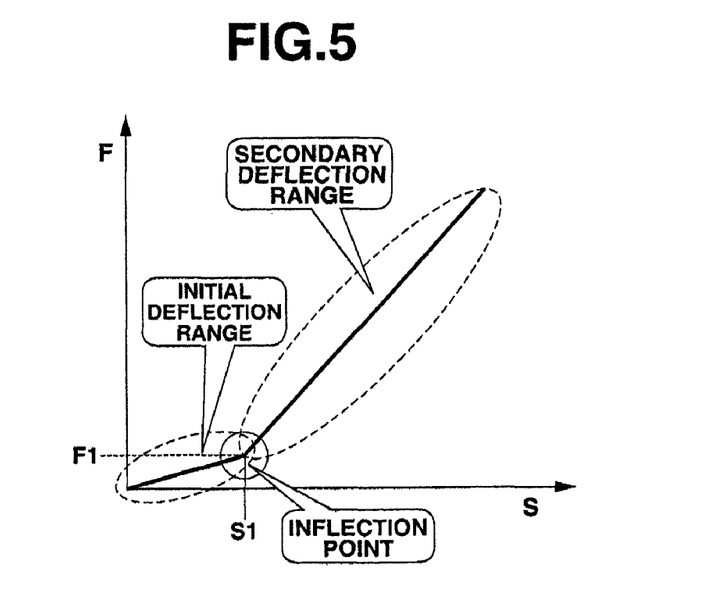
FIG. 5 is a F-S diagram showing the relationship between a reaction F and a stroke S of a skin section in the first embodiment.
Figure 7:
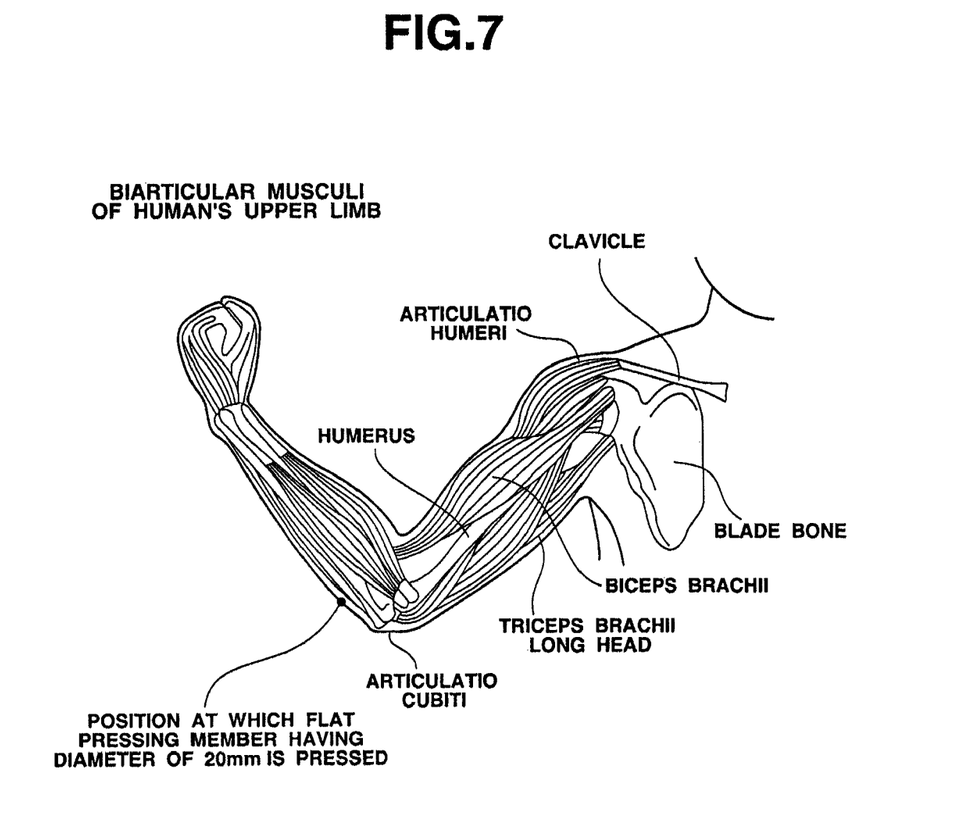
FIG. 7 is an imaginary view showing a human body structure.

FIG. 5 represents the relationship between a reaction force F applied to an arm of an occupant and a moving stroke S of a skin section 121 as a force-stroke (F-S) diagram. The F-S diagram of FIG. 5 shows a two-stage elastic deformation, in which a first stage is an initial deflection range in which reaction force F is between 0 and force F1 at which point rib 125 and rib 135 may be brought into contact with each other. A second stage of the F-S diagram is a secondary deflection range in which the reaction force F is not less than F1 after rib 125 and rib 135 may be brought into contact with each other. Additionally, a point at which a changeover may be made between the initial deflection range and second deflection range is an inflection point, noted at S1. Here, the reaction force F1 at the inflection point may be set near a load with which a person's arm may bend, i.e., the flesh of an elbow strikes against a bone, upon pushing an arm of a typical body of male and female persons in twenties and thirties who seem to be relatively high in sensitivity of tactile impression, with a flat pressure member having a diameter of 20 mm (1 mm/sec.), as shown in FIG. 7. In this embodiment, reaction force F1 may be set at 1N to 3N, however, those skilled in the art will appreciate that the reaction force F1 may be set to other amounts of reaction force, without deviating from the scope of the present disclosure.

In accordance with one or more embodiments of the present disclosure, the reaction force in the initial deflection range may be set to be within a range where a softness with which the occupant's arm sinks into the contact surface 120 upon coming into contact with skin section 121 may be felt in tactile impression. Additionally, the reaction force in the secondary deflection range may be set larger than the reaction force in the initial deflection range and within a range where the arm may be supported without a bottom-reaching feeling and preventing the tactile impression sensitivity from being weakened. Further, a change of rate of reaction force F to moving stroke S of skin section 121 in the initial deflection range may be set smaller than that in the secondary deflection range. Accordingly, a softness and/or low impact feeling may be provided to an occupant in the initial deflection range whereas a feeling for stably supporting the arm may be provided to the occupant in the secondary deflection range.

Figure 6A:
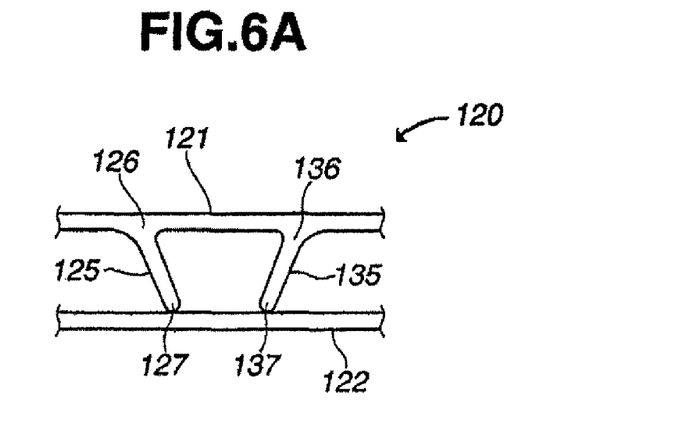
FIGS. 6A, 6B, and 6C are imaginary views showing the deformation of a projection section in the first embodiment.

Next, deformation of contact surface 120 in accordance with one or more embodiments of the present disclosure will be discussed with reference to FIGS. 6A-6C.

Figure 6B:
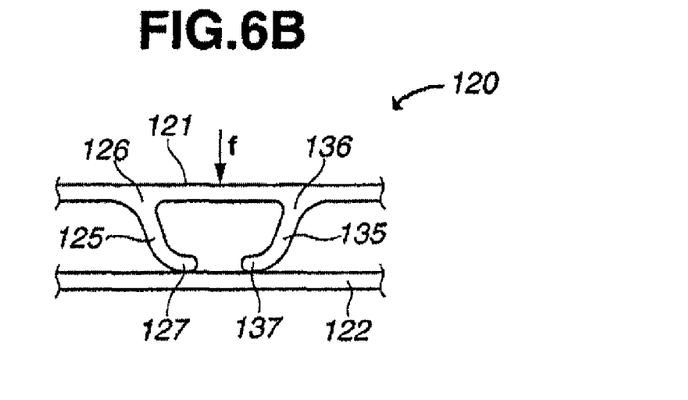

When an occupant may put his arm on contact surface 120, skin section 121 may be depressed (or deformed) toward base section 122 under a load f applied from the arm of the occupant to the skin section 121 (see FIG. 6B). Upon application of load f, rib 125 and rib 135 may bend or deform toward each other so as to form an arcuate shape upon being in contact with each other (see FIG. 6C). Accordingly, the condition as shown in FIG. 6A may be changed into a condition as shown in FIG. 6B, which may correspond to the initial deflection range shown in FIG. 5. At this time, rib 125 and rib 135 may be inclined in directions to be opposite to each other, as discussed above, and rib tip end 127 and rib tip end 137 may tend to deform in directions to come into contact with each other because each of the outsides of rib base section 127 and rib base section 136 may be formed thick. Additionally, rib tip end 127 and rib tip end 137 may be formed nearly semicircular, and therefore rib tip ends 127 and 137 may smoothly move on base section 122, thereby making it possible to generate a stable and smooth reaction.

Figure 6C:
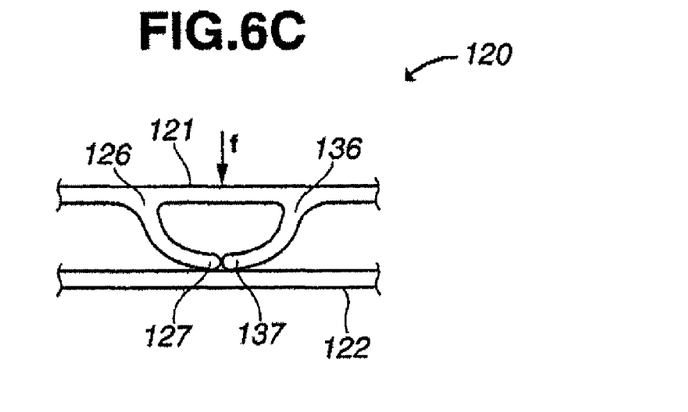

Further, as shown in FIG. 6C, rib tip end 127 and rib tip end 137 may contact and may therefore prevent complete collapse of ribs 125 and 135. The contacting condition may correspond to the condition of the inflection point S1 shown in FIG. 5. Further, after rib tip end 127 and rib tip end 137 contact with each other, rib tip end 127 and rib tip end 137 may bend as a one-piece body, which may serve as the second deflection range shown in FIG. 5. Thus, in accordance with one or more embodiments disclosed herein, a desired softness or low impact feeling may be provided to an occupant while the occupant's arm may be stably supported, and a bottom-reaching feeling may be avoided, regardless of assembly accuracy for parts.

Hereafter, a second embodiment of the present disclosure will be discussed with reference to FIGS. 8-11.

An arrangement of a support structure 200, according to one or more embodiments of the present disclosure will be discussed.

Discussion of support structure 200, in the second embodiment will be made only for parts different from those of the first embodiment, omitting discussion for parts similar to those of the first embodiment.

Support structure 200 for a vehicle may include a contact surface 220, and a plurality of ribs 225 and ribs 235 disposed on an underside of contact surface 220.

Figure 8:
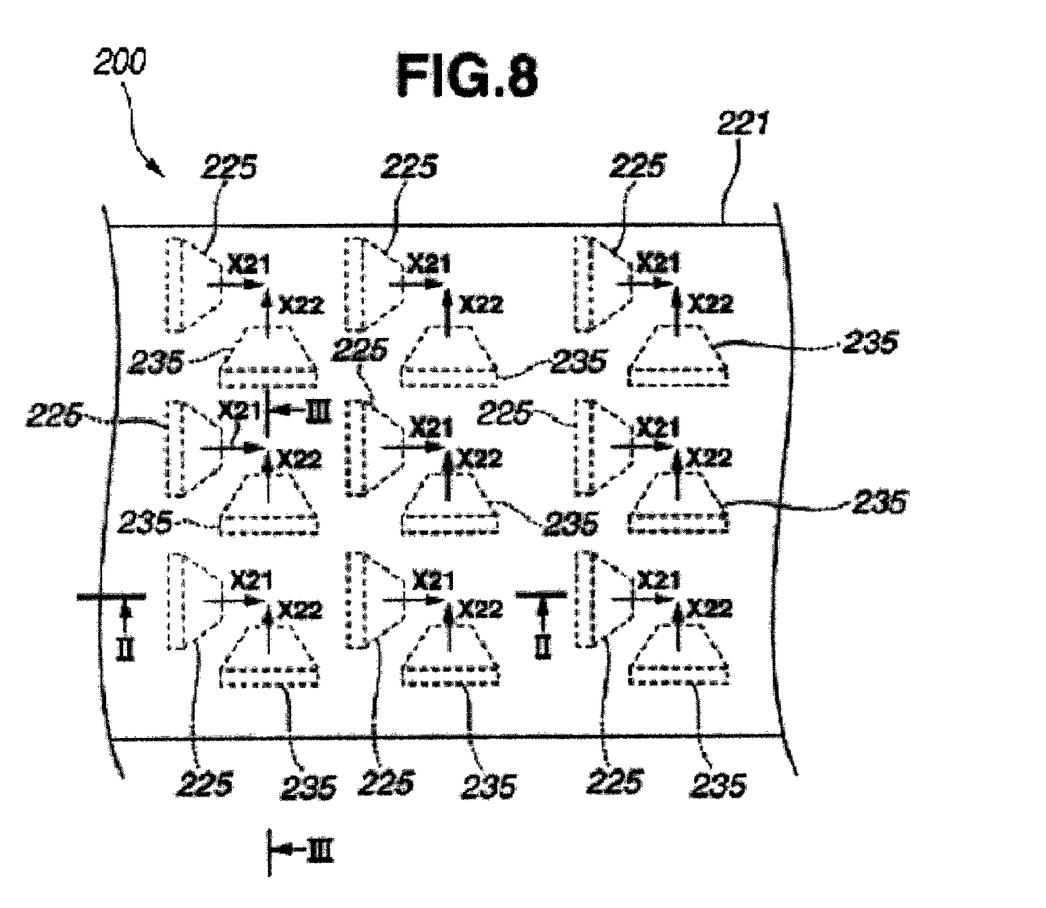
FIG. 8 is a top plan view of the vehicle, in a second embodiment, corresponding to that as viewed from VIEW-A of FIG. 1.
Figure 9:
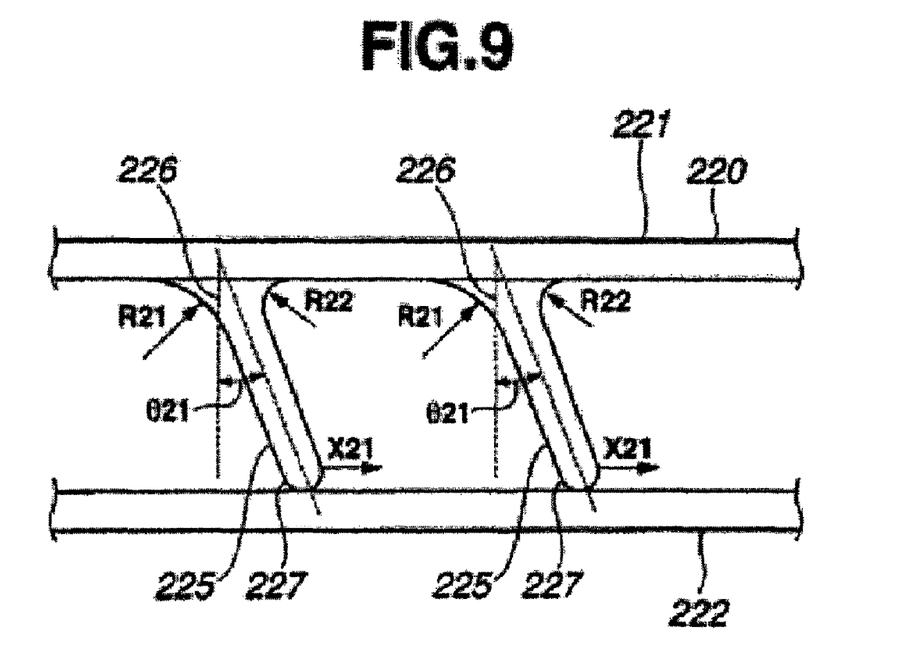
FIG. 9 is a sectional view taken along the line II-II of FIG. 8.
Figure 10:
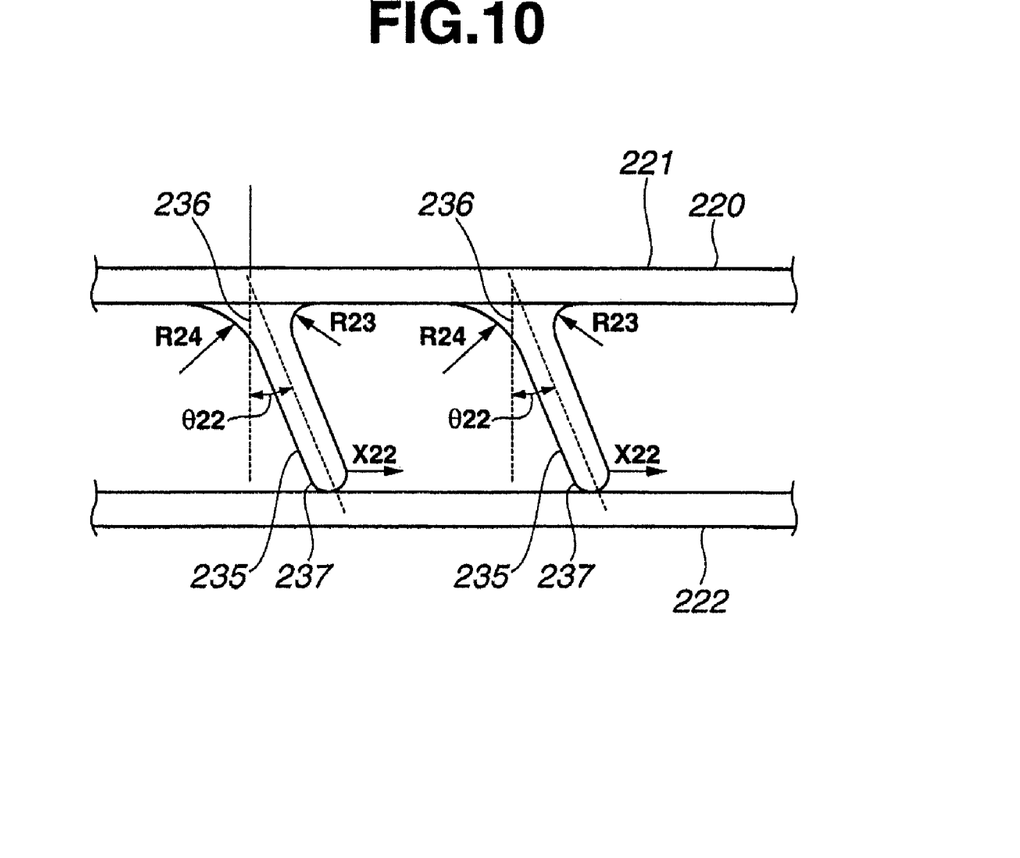
FIG. 10 is a sectional view taken along the line III-III of FIG. 8.

As shown in FIGS. 8-10, contact surface 220 may have ribs 225 and ribs 235 formed as projections extending from a backside surface of a skin section 221 toward a base section 222 and may be regularly located and/or spaced adjacent to each other in such a manner as not to contact with each other, as shown in FIGS. 8-10.

Referring to FIG. 9 (a cross-sectional view of FIG. 8 along the line II-II), rib 225 may be inclined from a rib base section 226 toward a rib tip end 227, as shown in FIG. 9. Rib tip end 227 may be in contact with base section 222. An inclination direction of rib 225 may be such that rib 225 may be inclined by an inclination angle θ21 relative to a vertical direction (shown as vertical dashed line 226 of FIG. 9).

Referring to FIG. 10 (a cross-sectional view of FIG. 8 along the line III-III), rib 235 may be inclined from a rib base section 236 toward a rib tip end 237, as shown in FIG. 10. Rib tip end 237 may be in contact with base section 222. An inclination direction of rib 235 may be such that the rib 235 may be inclined by an inclination angle θ22 relative to a vertical direction (shown as vertical dashed line 236 of FIG. 10).

According to one or more embodiments of the present disclosure, a collapse direction X21 may serve as a first collapse direction and a collapse direction X22 may serve as a second collapse direction. Collapse directions X21 and X22 may be formed such that a direction of inclination of each collapse direction X21 and X22 may intersect each other at nearly right angles, as shown in FIG. 8.

Next, deformation of arm rest 220 according to one or more embodiments of the present disclosure will be discussed with reference to FIGS. 11A and 11B.

Figure 11A:
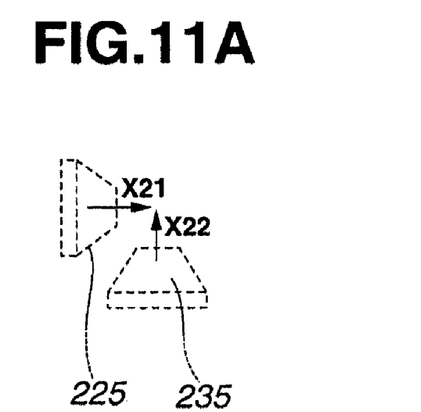
FIGS. 11A and 11B are imaginary views showing the deformation of a projection section in the second embodiment.
Figure 11B:
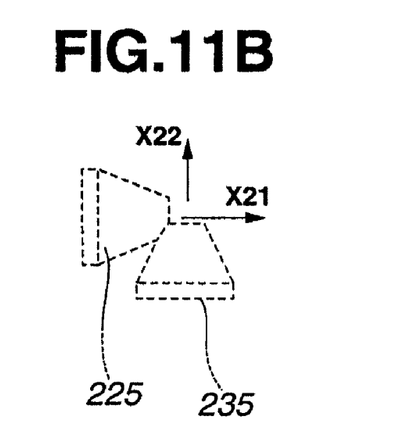

When an occupant may put his arm on contact surface 220, skin section 221 may depress (or deform) toward base section 222 under a load applied from the arm of the occupant to the skin section 221, so that rib 225 may collapse or deform in a collapse direction X21 while rib 235 may collapse or deform in a collapse direction X22, in which a condition of FIG. 11A may be changed into a condition of FIG. 11B. As shown in FIG. 11B, rib 235 may contact the side of rib 235, so that the ribs 225 and 235 may deform and bend restricting complete collapse of the ribs 225 and 235. Accordingly, a softness or low impact feeling may be provided to an occupant.

The same effects as in the first embodiment may be obtained in the second embodiment, as discussed above.

The embodiments of the present disclosure are not limited to the above-mentioned ones, as a variety of other embodiments may be employed. For example, it may be possible to apply embodiments the present disclosure to interior parts in a passenger compartment, such as an instrument panel, a roof panel and the like which may be touched by an occupant. Additionally, embodiments of the present disclosure may be used for a surface structure of any parts and/or surfaces which may be desired to have soft or low impact contact, such as the interior parts of tramcars, airplanes, ships or the like, office supplies, architectural materials, furniture. Additionally, collapse direction X1 and collapse direction X2 may be formed at any angles if they intersect each other. Additionally, while the ribs of the contact surface may be inclined, respectively, from their base sections, in the above embodiments, they may take structures in which the ribs vertically project from the skin sections without being inclined at their base sections and may be inclined from any intermediate portion and/or section.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

The invention claimed is:

1. A support structure, comprising:
   a contact surface configured to deform;
   a base section configured to receive the contact surface;
   a first set of ribs extending from the contact surface toward the base section and inclined in a first direction; and
   a second set of ribs extending from the contact surface toward the base section and inclined in a second direction,
   wherein the first set of ribs and the second set of ribs are disposed such that there is no contact with each other in a relaxed position, and
   wherein the first set of ribs and the second set of ribs are configured to deform and contact each other upon application of a force in a vertical direction to the contact surface,
   wherein the vertical direction is an average of the first direction and the second direction.

2. The support structure of claim 1, further comprising:
   a first pitch configured to be a distance between a base of a rib of the first set of ribs and a base of a rib of the second set of ribs; and a second pitch configured to be a distance between a tip of the rib of the first set of ribs and a tip of the rib of the second set of ribs,
   wherein the first direction and the second direction are inclined toward each other, and wherein the first pitch is larger than the second pitch.

3. The support structure of claim 2, wherein a ratio of the second pitch to the first pitch is between 0.35 and 0.70.

4. The support structure of claim 1, wherein the ribs of the first set of ribs and the ribs of the second set of ribs are tapered such that a base thickness of the ribs is larger than a tip thickness of the ribs.

5. The support structure of claim 4, wherein the base thickness is unequal, such that a base thickness on a first side of the rib is thicker than a base thickness on a second side of the rib.

6. The support structure of claim 1, wherein tips of at least one of the ribs of the first set of ribs and second set of ribs are rounded.

7. The support structure of claim 1, wherein the ribs of at least one of the ribs of the first set of ribs and the second set of ribs are plate shaped.

8. The support structure of claim 1, further comprising:
   a point of contact between ribs of the first set of ribs and the ribs of the second set of ribs,
   wherein a reaction force of the support structure during deformation prior to the ribs reaching the point of contact is less than a reaction force of the support structure after reaching the point of contact.

9. The support structure of claim 1, wherein the first direction and the second direction are inclined toward each other.

10. The support structure of claim 1, wherein the first direction and the second direction are inclined perpendicular to each other.

11. The support structure of claim 1, wherein the support structure comprises an arm rest for a vehicle.

12. A support structure, the support structure comprising:
    a contact surface configured to deform;
    a base section configured to receive the contact surface;
    a first means for softening a deformation of the contact surface disposed on the contact surface and inclined in a first direction towards the base section; and
    a second means for softening a deformation of the contact surface disposed on the contract surface and inclined in a second direction towards the base section,
    wherein the first and second means for softening are disposed such that the first means and second means for softening have no contact in a relaxed position, and
    wherein the first and second means for softening contact each other upon deformation of the contact surface by a force in a vertical direction,
    wherein the vertical direction is an average of the first direction and the second direction.

13. The support structure of claim 12, wherein the first means for softening is inclined in a first direction, wherein the second means for softening is inclined in a second direction, and wherein the first direction and the second direction are inclined towards each other.

14. The support structure of claim 12, wherein the first means for softening is inclined in a first direction, wherein the second means for softening is inclined in a second direction, and wherein the first direction and the second direction are inclined perpendicular each other.

15. A method to make a support structure, the method comprising:
    disposing a first set of ribs on a contact surface inclined towards a base section in a first direction; and
    disposing a second set of ribs on the contact surface inclined towards the base section in a second direction;
    wherein the first set of ribs and the second set of ribs are not in contact in a relaxed position, and
    wherein the first set of ribs and the second set of ribs are in contact in a deformed position resulting from force in a vertical direction,
    wherein the vertical direction is an average of the first direction and the second direction.

16. The method of claim 15, wherein the first direction and the second direction are inclined toward each other.

17. The method of claim 15, wherein the first direction and the second direction are inclined perpendicular to each other.

18. The method of claim 15, further comprising: placing the contact surface over a base section, wherein the first set of ribs and the second set of ribs are configured to contact the base section.

19. The method of claim 15, wherein the first set of ribs is disposed a distance from the second set of ribs such that a ratio of a distance between a base of a rib of the first set of ribs to a base of a rib of the second set of ribs to a distance between a tip of the rib of the first set of ribs to a tip of the rib of the second set of ribs is between 0.35 and 0.70.

20. The method of claim 15, further comprising: installing the contact surface in a vehicle.

21. The support structure of claim 1, wherein the force in the vertical direction has a magnitude in a range from 1N to 3N.

22. The support structure of claim 1, wherein tips of the first set of ribs and the second set of ribs are in contact with the base portion in the relaxed state.

* * * * *